United States Patent
Dinkel et al.

(10) Patent No.: US 6,688,707 B1
(45) Date of Patent: Feb. 10, 2004

(54) HYDRAULIC AGGREGATE

(75) Inventors: Dieter Dinkel, Schwalbach (DE); Axel Hinz, Neu-Anspach (DE); Hans-Dieter Reinartz, Frankfurt am Main (DE); Günther Vogel, Dreieich (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 3 days.

(21) Appl. No.: 10/019,876

(22) PCT Filed: Jun. 21, 2000

(86) PCT No.: PCT/EP00/05697

§ 371 (c)(1),
(2), (4) Date: Dec. 26, 2001

(87) PCT Pub. No.: WO01/00471

PCT Pub. Date: Jan. 4, 2001

(30) Foreign Application Priority Data

Feb. 12, 1999 (DE) .......................... 199 58 194
Jun. 29, 1999 (DE) .......................... 199 29 581

(51) Int. Cl.⁷ ................................. B60T 6/36
(52) U.S. Cl. ...................... 303/119.3; 303/DIG. 10
(58) Field of Search ...................... 303/119.3, DIG. 10, 303/DIG. 11, 116.1, 113.1

(56) References Cited

U.S. PATENT DOCUMENTS

| 5,538,335 A | | 7/1996 | Saito et al. | |
|---|---|---|---|---|
| 5,593,216 A | * | 1/1997 | Hosoya et al. | 303/119.2 |
| 6,102,495 A | * | 8/2000 | Zaviska | 303/116.4 |
| 6,260,933 B1 | * | 7/2001 | Dinkel et al. | 303/113.1 |
| 6,270,170 B1 | * | 8/2001 | Isogai et al. | 303/119.3 |
| 6,398,315 B1 | * | 6/2002 | Dinkel et al. | 303/113.1 |
| 6,428,121 B1 | * | 8/2002 | Dinkel et al. | 303/191 |

FOREIGN PATENT DOCUMENTS

| DE | 39 07 969 | 9/1990 |
|---|---|---|
| DE | 41 07 979 | 9/1992 |
| DE | 197 32 771 | 2/1999 |
| DE | 198 08 626 | 9/1999 |
| EP | 0 687 814 | 12/1995 |
| JP | 10047256 | 2/1998 |
| WO | 91 16220 | 10/1991 |
| WO | 94 27045 | 11/1994 |
| WO | 97 18113 | 5/1997 |
| WO | 98 56630 | 12/1998 |
| WO | 99 25594 | 5/1999 |

* cited by examiner

Primary Examiner—Robert A. Siconolei
(74) Attorney, Agent, or Firm—Rader, Fishman & Grauer PLLC

(57) ABSTRACT

The present invention relates to a hydraulic aggregate for a slip-controlled brake system which includes noise damping chambers integrated in a pump bore, wherein there is a hydraulic connection between the brake pressure generator ports and the noise damping chambers by means of pressure fluid channels that open radially or tangentially into the pump bore and are connected to the valve accommodating bores of the first valve row of an accommodating member in which the inlet valves are received.

7 Claims, 2 Drawing Sheets

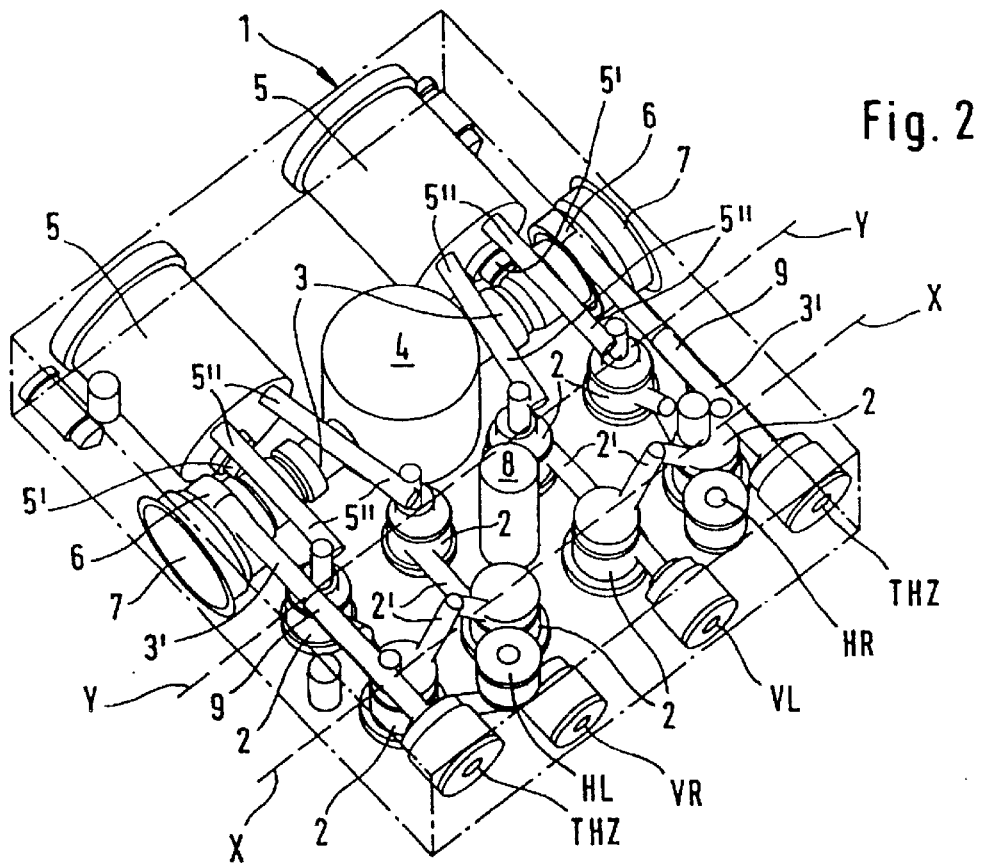

HYDRAULIC AGGREGATE

TECHNICAL FIELD

The present invention relates to a hydraulic aggregate for a slip-controlled brake system.

BACKGROUND OF THE INVENTION

A hydraulic aggregate of the above-mentioned type is disclosed in WO 91/16220. It is disclosed in this publication to arrange the noise damping chambers in parallel to the low pressure accumulator bores which are, thus, jointly aligned in one row laterally of a pump bore. The pressure fluid channels for the brake pressure generator ports at the block-shaped accommodating member extend vertically through the valve accommodating bores provided for the inlet valves and laterally pass by the pump bore into the bottom area of the noise damping chambers. Extending in parallel to each pressure fluid channel that opens into the noise damping chamber is another vertical pressure fluid channel for each brake circuit which exclusively connects the pump bore to the noise damping chamber.

The result is a block-type construction that exceeds the shape of a block, i.e., has considerably differing edge lengths, in order to be able to realize the necessary noise damping chambers and the low pressure accumulator bores. On the other hand, there is the need to remove a large machining volume from the block by means of various drilling operations from different directions. Consequently, sophisticated measures are needed, especially for making the noise damping chambers and the necessary pressure fluid channels. Further, the chosen split-up of the valve rows necessitates locating the wheel brake ports on both lateral surfaces of the block-shaped accommodating member so that a connection pattern for the pipe system is achieved which is split onto three lateral surfaces of the accommodating member. This, in turn, requires more space and increases the number of assembly steps needed.

In view of the above, an object of the present invention is to manufacture a hydraulic aggregate of the above-mentioned type which is dimensioned as small as possible and is as inexpensive as possible to make. A special object is to reduce the effort in manufacture for connecting the noise damping chambers to the brake pressure generator ports, and the hydraulic connections of the pump bores and the second valve row that accommodates the output valves along with the noise damping chambers and the connection of the low pressure accumulator bores by way of the pump bore to the noise damping chambers.

BRIEF DESCRIPTION OF THE DRAWINGS

FIG. 2 is a perspective view of another embodiment of a hydraulic aggregate with pressure fluid channels that open both vertically and transversely into the block-shaped accommodating member.

FIG. 3 is a perspective view of a block-shaped hydraulic aggregate with a connection pattern for the brake pressure generator ports and wheel brake ports that is modified compared to FIGS. 1 and 2.

DETAILED DESCRIPTION OF THE PREFERRED EMBODIMENTS

Figure 1A:
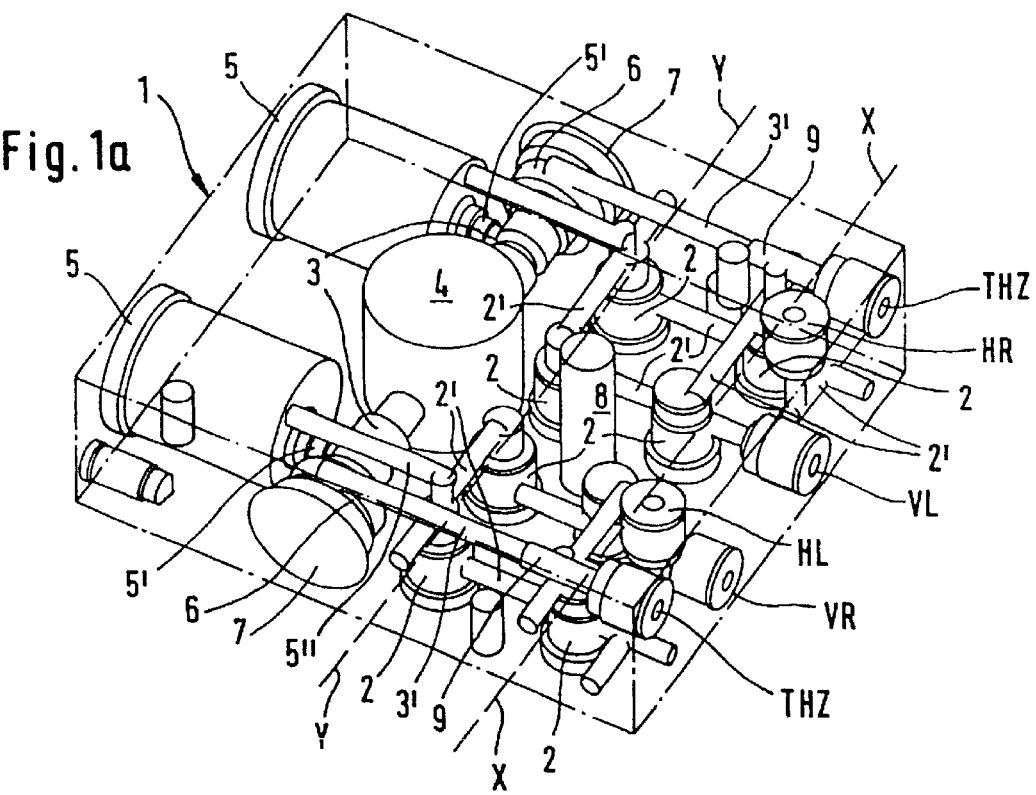
FIG. 1a is a perspective view of the arrangement of bores in a housing by using pressure fluid channels that open exclusively vertically into the square accommodating member of a hydraulic aggregate.

FIG. 1a shows a hydraulic aggregate for a slip-controlled brake system, including a block-shaped accommodating member 1 which accommodates inlet and outlet valves in several valve accommodating bores 2 of a first and a second valve row X, Y and which includes a pump bore 3 outside the two valve rows X, Y which points transversely to the direction in which the valve accommodating bore 2 opens into the accommodating member 1. Further, a motor accommodating bore 4 which opens vertically between half the bore length into the pump bore 3 is arranged outside with respect to the two valve rows X, Y. In addition, low pressure accumulator bores 5 are arranged in the accommodating member 1 outside the two valve rows X, Y, the bores 5 pointing vertically to the axes of symmetry of the valve accommodating bores 2 and vertically to the longitudinal axis of pump bore 3 into the accommodating member 1. Several pressure fluid channels 2', 3', 5' which connect the valve accommodating bores 2, pump bores, and low pressure accumulator bores 3, 5 ensure a hydraulic connection between two brake pressure generator ports THZ provided in the accommodating member 1 and the four wheel brake ports HR, HL, VR, VL. Further, two hollow-cylindrical noise damping chambers 6 are provided in the pump bore 3 and connected to the brake pressure generator ports THZ that open into the accommodating member 1, directly by way of the pressure fluid channels 3' that extend transversely to the pump axis. According to the present invention, the noise damping chambers 6 are hence integrated in the pump bore 3, and the brake pressure generator ports THZ are in connection to the noise damping chambers 6 by way of pressure fluid channels 3' that open radially, preferably tangentially, into the pump bore 3 downstream of the pump pressure valves. The pressure fluid channels 3' each include a branch line to the valve accommodating bores 2 of the first valve row X that accommodates the inlet valves. The noise damping chambers 6 are arranged in the diametrically disposed ends of the pump bore 3 so that, advantageously, both the noise damping chambers 6 and the pump bore 3 are pressure-fluid tightly closed by means of closure members 7 inserted from outwards into the two lateral surfaces of the accommodating member 1. The pump bore 3 which penetrates the accommodating member 1 at right angles relative to the low pressure accumulator bores 5 includes a stepped portion 10 (see explicitly FIG. 1b in this respect) in the area between the bore portion that is provided for the two pump pistons and the noise damping chamber 6, on both sides of the radial piston pump. Pump suction channels 5' open into stepped portion 10 in the direction of the low pressure accumulator bores 5. The pump suction channels 5' are provided in a particularly space-saving fashion by the combination of an accommodating bore for the pump suction valve (non-return valve) that is respectively fitted into the bottom of the low pressure accumulator bore 5 and by a milling operation inside the pump bore 3. The latter operation is effected in each case by introducing a periphery milling tool into the pump bore 3, which tool must remove only a small layer from the pump wall in the direction of the accommodating bore arranged within each low pressure accumulator bore 5. This obviates the need for deburring of the pump bore 3 which has previously been necessary due to the drilling operation in this area, and also for a sophisticated pump suction channel. Instead, the pump channel 5' may be realized to become extremely short due to the accommodating bore for the pump suction valve meeting the milled slot of the pump bore 3 from opposite directions. Also, the pump bore 3 has an axial offset on either side of the motor accommodating bore 4 in order to minimize the surface wear in the pump bore 3 due to the pistons of a radial piston pump moving therein.

The second valve row Y comprises exclusively the valve accommodating bores 2 provided for the outlet valves which are optimally disposed between the pump bore 3 and the first valve row X that exclusively includes the valve accommodating bores 2 for the inlet valves. The result are especially short, straight pressure fluid channels 2' between the two valve rows X, Y and an extremely favorable connection between the valve row Y and the low pressure accumulator bores 5 via the return channels 5'. The pump suction channel 5' that is arranged between the pump bore 3 and the low pressure accumulator bore 5 is rated to be so short and, thus, extremely space-saving due to the arrangement of the individual accommodating bores in a block as mentioned hereinabove that the non-return valve (pump suction valve) which is biased and closes in the direction of the low pressure accumulator bore 5 may be optimally positioned therein with least possible structural requirements.

The wheel brake ports HL, HR which likewise lead to the pressure fluid channels 2' are arranged on the top side of the accommodating member 1 in parallel to the motor accommodating bore 4, which is favorable with respect to the assembly. This arrangement permits several pipe lines to be screwed in an unproblematic and easily accessible manner beside a motor housing to be flanged to the motor accommodating bore 4.

Another through-bore 8 is disposed in the accommodating member 1 in a central position between the two valve rows X, Y. This provision permits leading an electric plug which projects from the motor housing in a shortest way from the top side to the bottom side of the block-shaped accommodating member 1 with a view to connecting the plug to a valve control device attached to the bottom side of the accommodating member 1 for electrical contacting purposes. The valve control device additionally comprises the control electronics for driving the electric motor integrated in the motor housing.

FIG. 1a illustrates the advantages of the selected arrangement of bores in the block of the accommodating member 1 by means of pressure fluid channels 2', 3', 5', 5" which are arranged exclusively vertically to the surfaces of the member 1. The arrangement of bores in the block is optimized to such an extent that merely the pressure fluid channels 2' which are provided for the valve rows X, Y are closed by a ball at the lateral surfaces of the accommodating member 1, that means, they must be closed by appropriate sealing plugs. In contrast thereto, the pressure fluid channels 3', 5' are so favorably chosen that the above-mentioned sealing plugs are eliminated. For example, the pressure fluid channel 3' that connects the noise damping chamber 6 to the brake pressure generator port THZ extends radially or tangentially as a straight blind-end bore though the brake pressure generator port THZ into the noise damping chamber 6. Similarly, the pump suction channel 5' and the non-return channel 5" connected to the second valve row Y is provided for each brake circuit in the hydraulic aggregate in the way of a blind-end bore into the low pressure accumulator bore 5 which latter, after the accommodation of the low pressure accumulator piston and the piston return spring, is closed by means of the low pressure accumulator cover.

The result of the direct arrangement of the pump bore 3 between the low pressure accumulator bores 5 and the second valve row Y is, in addition, especially short pressure fluid paths, that are optimized in terms of clearance volume, between the normally closed outlet valves of the second valve row Y via the low pressure accumulator 5 to the pump bore 3, thereby simplifying the evacuation and filling process necessary for the initial filling of the hydraulic aggregate.

Figure 1B:
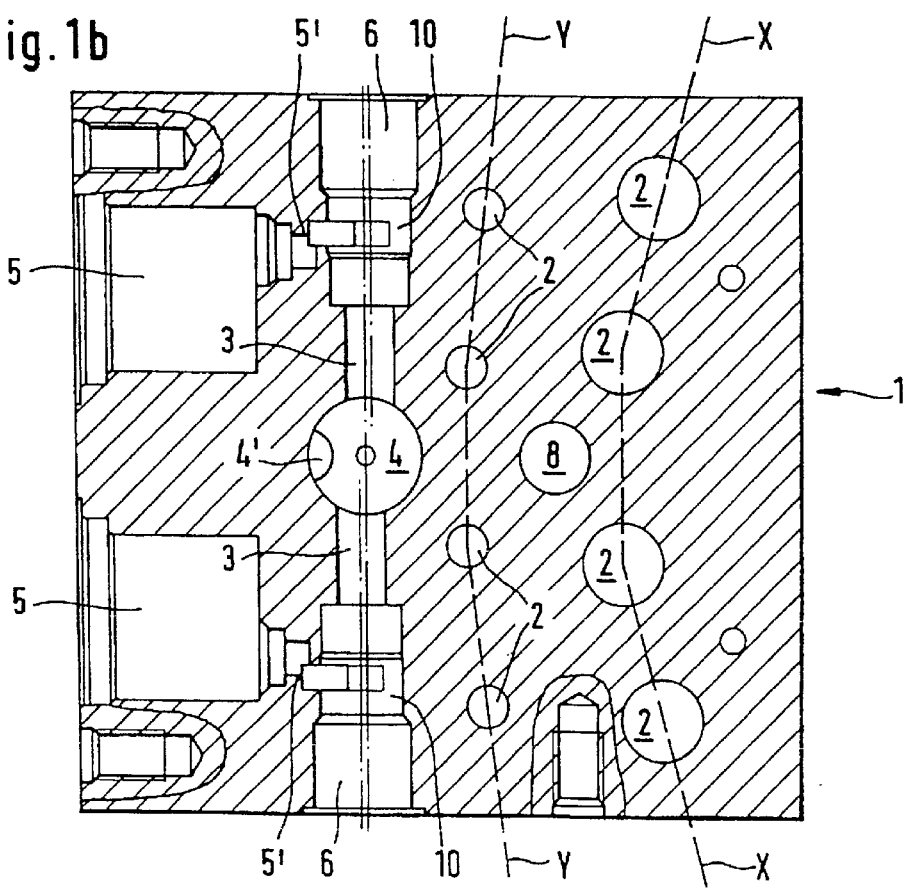
FIG. 1b is a cross-section taken through the accommodating member according to FIG. 1a in the plane of the pump bore.

FIG. 1b shows a cross-section taken through the accommodating member 1 known from FIG. 1a at the level of pump bore 3 in order to illustrate the extremely short pump suction channel 5'. What can be easily seen are the extremely short distances of the pump bore 3 with the noise damping chambers 6 integrated therein compared to the low pressure accumulator bores 5 and the valve accommodating bores 2 of the second valve row Y arranged on the respective sides of the pump bore 3. To arrange for the noise damping chambers 6 at the outer ends of the pump bore 3 there is only need for two bore steps at both ends which manufacture the pump suction channels 5' by means of a periphery milling tool in the direction of the low pressure accumulator bores 5. Further, a leakage channel 4' can be seen in FIG. 1b which is adjacent to the motor accommodating bore 4 and penetrates the accommodating member 1 in the direction of the valve control device that is disposed at the bottom side of the hydraulic aggregate, so that the leakage fluid which propagates from the pump bore 3 into the motor accommodating bore 4 can be taken up and stored in the fluid-tight housing of the valve control device.

Different from the preceding embodiments according to FIGS. 1a and 1b, the embodiment of FIG. 2 exhibits an arrangement of bores in a block which maintains the basic design according to the present invention described hereinabove, but obviates the need for the already mentioned ball-type closure or arrangement of a separate channel closing means for the pressure fluid channels 2' in the area of the two valve rows X, Y. This is done by forming the pressure fluid channels 2' of the first valve row X in pairs for each brake circuit from the bottom side of the accommodating member 1, as shown in the drawing, to extend transversely through the valve accommodating bore 2 so that they meet each other at an acute angle in the accommodating member 1 and thus constitute the required pressure fluid connection between respectively one pair of inlet valves per brake circuit in the first valve row X. The ball-type closing arrangement of the pressure fluid channels 2' of the second valve row Y, as disclosed in FIG. 1a, may also be avoided by connecting the pressure fluid channels 2' of the second valve row Y in pairs for each brake circuit to the valve accommodating bores 2 of the corresponding brake circuit by way of the associated low pressure accumulator bore 5. For this purpose, two return channels 5" in each low pressure accumulator bore 5 extend directly to the valve accommodating bores 2 of a preferably diagonal split-up brake circuit, the said bores 2 being combined in pairs per valve row Y. Consequently, the lateral arrangement of bores as shown in FIG. 1a has changed in the direction of the two valve rows X, Y to such an extent that the pressure fluid channels 2' of the two valve rows X, Y no longer have to be additionally closed from the outside.

In all previous embodiments of the present invention (FIGS. 1a, 1b, 2), each pressure fluid channel 3' that connects the brake pressure generator port THZ to the noise damping chamber 6 contains a diaphragm member 9 to improve noise damping which is inserted through the brake pressure generator port THZ into the pressure fluid channel 3'. The diaphragm member 9 is positioned between the two valve rows X, Y in the pressure fluid channel 3' that extends transversely with respect to the rows in such a manner that the diaphragm member 9 has no throttling effect on the upstream branch line of the pressure fluid channel 3' which leads to the inlet valves of the first valve row X.

In contrast thereto, the diaphragm member 9 in FIG. 3 is inserted from the opposite direction into an extension of the pressure fluid channel 3' that passes beside the low pressure accumulator bore 5, which insertion is necessary due to a modified connection pattern for the mouths of the brake pressure generator ports THZ and wheel brake ports VR, VL, HR, HL that open into the associated pressure fluid channels 2', 3'. Due to the arrangement of the brake pressure generator port THZ now offset from the longitudinal axis of the channel, the pressure fluid channel 3' leads in each case from the lateral surface that contains the low pressure accumulator bore 5, traversing the pump or noise damping chamber 3, 6, to the first valve row X. In other respects, the arrangement of bores in the block corresponds in all basic features to the embodiments of this invention according to FIGS. 1a, 1b.

What is claimed is:

1. Hydraulic aggregate for a slip-controlled brake system, comprising:

an accommodating member which receives inlet and outlet valves in several valve accommodating bores of a first and second valve row, a pump bore arranged outside the two valve rows in the accommodating member and pointing transversely to the direction the valve accommodating bores open into the accommodating member, a motor accommodating bore arranged outside the two valve rows in the accommodating member and pointing vertically to the pump bore, two low pressure accumulator bores which open outside the two valve rows into the accommodating member and open into the accommodating member vertically to the axes of the valve accommodating bores and the pump bore, two hollow-cylindrical noise damping chambers connected to the pump bore and being in a hydraulic connection to two brake pressure generator ports that open into the accommodating member, several pressure fluid channels that connect the valve accommodating bores, pump bores, and low pressure accumulator bores and are adapted to provide a hydraulic connection between the brake pressure generator ports that open into the accommodating member and the wheel brake ports, wherein the two noise damping chambers are integrated in the pump bore, and wherein the brake pressure generator ports have a hydraulic connection to the noise damping chambers by way of pressure fluid channels that open radially or tangentially into the pump bore, the said pressure fluid channels being connected to the valve accommodating bores of the first valve row that accommodates the inlet valves wherein the wheel brake ports and/or the brake pressure generator ports are arranged at least partly in parallel to the motor accommodating bore, and the ports open into the accommodating member beside a motor housing that projects from the motor accommodating bore at the top side of the accommodating member.

2. Hydraulic aggregate as claimed in claim 1, wherein the two noise damping chambers are arranged at the diametrally positioned ends of the pump bore, and wherein both the two noise damping chambers and the pump bore are pressure-fluid tightly closed by means of closure members inserted from outwards into the two lateral surfaces of the accommodating member.

3. Hydraulic aggregate as claimed in claim 1, wherein there is provision of pump suction channels between the low pressure accumulator bores and the pump bore, the said channels opening at right angles into pump bore and being made preferably by a milling operation on the inside periphery of the pump bore.

4. Hydraulic aggregate as claimed in claim 1, wherein the pump bore has an axial offset on either side of the motor accommodating bore.

5. Hydraulic aggregate as claimed in claim 1, wherein the second valve row comprises exclusively the valve accommodating bores for the outlet valves which are disposed between the pump bore and the first valve row that exclusively includes the valve accommodating bores for the inlet valves, with the result that the second valve row extends directly alongside the pump bore.

6. Hydraulic aggregate as claimed in claim 3, wherein a non-return valve which is biassed and closes in the direction of the low pressure accumulator bore is installed in the pump suction channel.

7. Hydraulic aggregate as claimed in claim 1, wherein fitted on the bottom side of the accommodating member opposite to the motor housing is a valve control device which additionally comprises the control electronics for driving an electric motor for a radial piston pump integrated in the motor housing, and an electric plug of the electric motor projects through a through-bore disposed between the two valve rows and makes a contact with the valve control device.

* * * * *